June 27, 1950     D. W. SMITH     2,513,114
LIQUID AIR TRAP
Filed Oct. 19, 1944
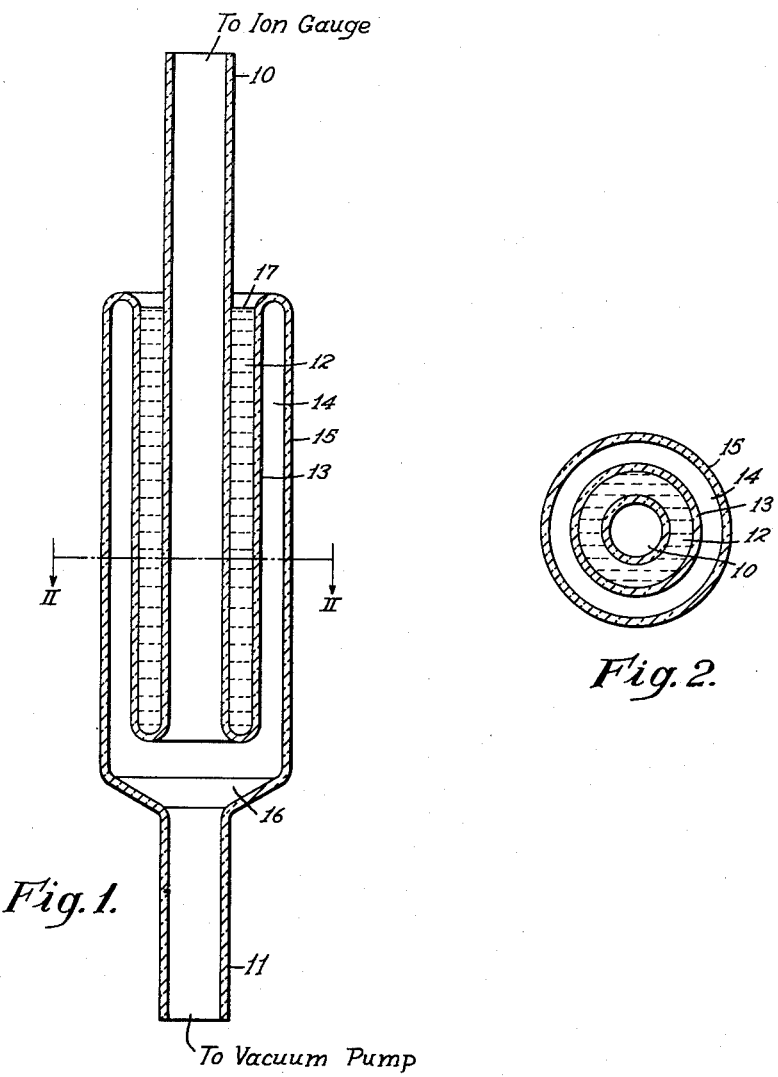
INVENTOR
Douglas W. Smith.
BY
ATTORNEY Patented June 27, 1950

2,513,114

UNITED STATES PATENT OFFICE 2,513,114

LIQUID AIR TRAP

Douglas W. Smith, Stevensville, Mich., assignor, by mesne assignments, to the United States of America as represented by the United States Atomic Energy Commission Application October 19, 1944, Serial No. 559,467

2 Claims. (Cl. 257—29)

This invention relates to cold traps and particularly to liquid air traps for condensing water and other vapors, such as mercury vapors, present in a vacuum line.

In high vacuum systems it is customary to attach an ion gauge to the system for measuring the degree of vacuum and so detect any leaks that may develop therein. In order to prevent water or other vapors, such as mercury vapors, from entering the ion gauge, it is the practice to freeze out such vapors in a cold trap made by inserting a dewar, or double-walled vacuum flask, in the vacuum line and filling the flask with liquid air. Such a construction is illustrated in Fig. 8 of United States Letters Patent No. 1,367,865 to Crawford and in Fig. 19, examples $c'$, $c''$ appearing on page 122 of "Procedures in Experimental Physics" by John Strong, New York (1943). The vacuum line is thus made to pass between the inner and outer walls of the dewar. In such an arrangement the inner wall of the dewar is chilled by the liquid air, while the outer wall is exposed to the atmosphere and is not chilled. Any vapors in the vacuum line coming in contact with the inner or chilled wall condense and adhere thereto, but vapors contacting the outer unchilled wall are not condensed and may pass into the ion gauge. As a result, removal of undesired vapors is not complete.

Also, traps of the sort heretofore used have the disadvantage of presenting a large surface of liquid air to the atmosphere thus causing rapid evaporation and loss of refrigerant. Furthermore, loss of refrigerant creates misleading data at the ion gauge. In a vacuum system of known pressure if the liquid air level drops no more than half an inch, less vapor will be frozen from the line and the degree of vacuum indicated at the ion gauge will be lower than is actually the case. Similarly, if the liquid air is replenished more vapor will be frozen out and the pressure shown by the ion gauge will indicate a misleadingly high degree of vacuum.

An object of this invention is to provide a cold trap that completely surrounds a fluid conduit and requires a minimum of refrigerant.

A further object is to provide a cold trap that is integral with a conduit in a vacuum system and utilizes the vacuum to insulate the refrigerant from the atmosphere.

A further object is to provide a cold trap that is designed to expose only a relatively small annular surface of refrigerant directly to the atmosphere.

A further object is to provide a cold trap that is capable of being maintained in operation for substantial periods of time without replenishing the refrigerant.

Other and further objects will be apparent from the following description taken in connection with the drawing, in which:

Fig. 1 is a cross sectional view of my improved liquid air trap, and

Fig. 2 is a view in cross section taken along line 2—2 of Fig. 1.

My invention consists in providng a cold trap integral with a tubular conduit and designed to surround the conduit with a cylindrical pool of liquid air; a double-walled, evacuated chamber being provided to insulate the liquid air from the atmosphere.

With reference to the drawings, my improved cold trap comprises a unitary structure including a pair of co-axially arranged conduits, one being an intake conduit 10, and the other an exhaust conduit 11. The intake conduit is surrounded by a suitable refrigerant, such as liquid air, carried in an annular well 12 co-axial with conduit 10 and defined by the outer surface of said conduit and inner wall portion 13 of the flask. An insulating chamber 14, of generally cylindrical configuration, circumscribes the refrigerant well and is defined by wall portion 13 and an outer wall portion 15 co-axial and parallel therewith. Chamber 14 communicates with exhaust conduit 11 at 16 and is maintained in an evacuated condition by a vacuum pump (not illustrated). Being evacuated, the chamber 14 serves to insulate the refrigerant in well 12 from the atmosphere and hence reduces loss of refrigerant through evaporation.

In operation, my improved cold trap is inserted in a vacuum line intermediate an ion gauge and a vacuum pump, and well 12 is filled with liquid air. Water and other vapors, such as mercury vapors originating in a diffusion pump connected, for example, to the conduit 11, condense and freeze to the walls of the conduit 10. Such vapors are thus confined to the conduit 10 and can not enter the ion gauge that is connected thereto. Chamber 14, being evacuated, insulates the pool of liquid air which is protected thereby from exposure to the atmosphere except for a relatively small annular surface 17.

While my cold trap is especially designed for use in a vacuum system and uses the vacuum system to provide an evacuated insulating chamber for the refrigerant, it is apparent that the trap can be used in any fluid line, although with reduced efficiency.

I prefer a design in which the refrigerant chamber and the insulating chamber are generally cylindrical in shape and concentric with the conduit to be cooled. However, other shapes may be adopted for this purpose without departing from the scope of this invention, the essential features of which consist in making the trap integral with the vacuum line, completely surrounding the line with refrigerant, and insulating the refrigerant from the atmosphere. My improved cold trap may be made of glass, although it is to be understood that the material used is not critical and numerous other suitable materials will readily suggest themselves to one skilled in the art.

The present construction marks a distinct advance over the prior art and has demonstrated its superiority thereover in actual use. Modification of the foregoing invention may suggest themselves to those skilled in the art, and such modifications as fall within the scope of the appended claims are contemplated as forming part of my invention.

I claim:

1. A cold trap for removing vapor from a vacuum line comprising a unitary structure including an inlet conduit and an exhaust conduit, means defining a well surrounding the inlet conduit, said well being adapted to receive a refrigerant, and means defining a chamber circumscribing said well, the chamber communicating with both the inlet conduit and the exhaust conduit and adapted to insulate the well from the atmosphere.

2. A cold trap for removing vapors from a vacuum line comprising a unitary structure including an inlet conduit and an exhaust conduit, means defining a well surrounding the inlet conduit, said well being adapted to receive a refrigerant, and means defining a chamber circumscribing said well, the chamber communicating with both the inlet conduit and the exhaust conduit and adapted to insulate the well from the atmosphere, said inlet conduit and said well and said chamber being disposed in co-axial relation, and said well and said chamber being substantially co-extensive in length.

DOUGLAS W. SMITH.

REFERENCES CITED

The following references are of record in the file of this patent:

UNITED STATES PATENTS

| Number | Name | Date |
|---|---|---|
| 1,529,597 | Langmuir | Mar. 10, 1925 |
| 1,845,247 | Davidson | Feb. 16, 1932 |
| 2,317,814 | Schuchmann et al. | Apr. 27, 1943 |
| 2,370,703 | Zaikowsky | Mar. 6, 1945 |

FOREIGN PATENTS

| Number | Country | Date |
|---|---|---|
| 201,321 | Germany | Sept. 8, 1908 |
| 433,770 | Great Britain | Aug. 20, 1935 |